United States Patent
Mackenzie

(10) Patent No.: US 8,248,463 B2
(45) Date of Patent: Aug. 21, 2012

(54) PATTERNS ENCODING COMMUNICATION PARAMETERS

(75) Inventor: Andrew Mackenzie, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1174 days.

(21) Appl. No.: 11/579,195

(22) PCT Filed: Apr. 27, 2005

(86) PCT No.: PCT/EP2005/051893
§ 371 (c)(1),
(2), (4) Date: Sep. 6, 2007

(87) PCT Pub. No.: WO2005/106776
PCT Pub. Date: Nov. 10, 2005

(65) Prior Publication Data
US 2008/0152224 A1    Jun. 26, 2008

(30) Foreign Application Priority Data
Apr. 28, 2004   (GB) ................................. 0409419.9

(51) Int. Cl.
*H04N 7/18* (2006.01)
(52) U.S. Cl. ......................................... 348/61; 382/141
(58) Field of Classification Search ................... 348/61; 382/141
See application file for complete search history.

(56) References Cited

U.S. PATENT DOCUMENTS

| | | | | |
|---|---|---|---|---|
| 5,515,347 | A | * | 5/1996 | Mulder et al. ............. 369/30.08 |
| 6,305,608 | B1 | * | 10/2001 | Nada et al. ................ 235/472.03 |
| 2002/0030104 | A1 | | 3/2002 | Matsui et al. |
| 2004/0150845 | A1 | * | 8/2004 | Brouhon ......................... 358/1.9 |
| 2006/0049260 | A1 | * | 3/2006 | Takahashi et al. ............ 235/454 |

FOREIGN PATENT DOCUMENTS

| WO | WO 01/26032 | 4/2001 |
|---|---|---|
| WO | WO 01/71476 | 9/2001 |
| WO | WO 03/000318 | 1/2003 |
| WO | WO 03/042912 | 5/2003 |
| WO | WO 03/056420 | 7/2003 |

* cited by examiner

*Primary Examiner* — Djenane Bayard

(57) ABSTRACT

A document processing system comprises a pattern generating system 212 arranged to generate a data encoding pattern 6, a printer 202 arranged to print a document 2 having the pattern thereon, and a receiver 220 arranged to receive data over a communication link. The pattern generating system 212 is arranged to generate the pattern 6 so as to encode data defining a communication parameter suitable for the transmission of data to the receiver 220 over the link.

18 Claims, 6 Drawing Sheets

PATTERNS ENCODING COMMUNICATION PARAMETERS

FIELD OF THE INVENTION

The present invention relates to computer systems that use data encoding patterns such as position identification patterns on products and an associated reading device to control the performance of various operations. In particular it relates to communication of data between the reading device of such as system and a receiving system.

BACKGROUND TO THE INVENTION

It is known to use documents having such position identification markings in combination with a pen having an imaging system, such as an infra red camera, within it, which is arranged to image a small area of the page close to the pen nib. The pen includes a processor having image processing capabilities and a memory and is triggered by a force sensor in the nib to record images from the camera as the pen is moved across the document. From these images the pen can determine the position of any marks made on the document by the pen. The pen markings can be stored directly as graphic images, which can then be stored and displayed in combination with other markings on the document. In some applications the simple recognition that a mark has been made by the pen on a predefined area of the document can be recorded, and this information used in any suitable way. This allows, for example, forms with check boxes on to be provided and the marking of the check boxes with the pen detected. In further applications the pen markings are analysed using character recognition tools and stored digitally as text.

WO 03/056420 discloses a system in which the pen transmits data to a computer system including positional data that has associated with it a definition of a communication mode by means of which the computer system should communicate with a further system such as a server. The computer system uses the positional data to determine, for example from a look-up system, the communication mode that is to be used, for example identifying the address of the server to be contacted.

SUMMARY OF THE INVENTION

According to a first aspect of the invention there is provided a pen for extracting data from a data encoding pattern on a product, the pen comprising a sensing system arranged to sense the pattern as the pen is passed over the product, a processor arranged to extract communication data and payload data from the pattern and determine from the communication data a communication parameter, and a transmitter arranged to transmit the payload data using a communication having said parameter from the pen to a receiving system.

The communication may be a wireless communication from the pen to a receiving system, or it may be a wired communication over a wire from the pen to the receiving system, or it may be a communication with a docking station into which the pen can be docked for the purposes of the communication.

The pen may extract the data directly from the pattern, for example if the pattern encodes the data, or it may extract it indirectly. For example it may generate or otherwise determine the data from the pattern by any number of steps, which may include algorithms or look up tables.

The payload data may be pen stroke data recording movements of the pen over the product. Alternatively the payload data may be other data derived from the pattern, such as the identity of the product having the pattern on it, or the identity of a user of the system, or other forms of data not directly derived from the pattern, such as the identity of the pen itself, or the time at which the pen was moved over the product.

The processor may be arranged to extract positional data from an area of the pattern and to use the positional data to determine whether the area of pattern also encodes the communication data. If it does, then the processor may be arranged to extract the communication data from the pattern, and use it to determine a parameter of the communication. This may be useful where the product, such as a form, has a specific area arranged to be marked by a user to initiate transmission of the data from the pen.

The parameter may, for example, be arranged to identify the receiving system to which the wireless communication is to be made, or it may include an encryption key arranged to enable the pen to transmit the pen stroke data to the receiving system in an encrypted format.

According to a second aspect of the invention there is provided a document processing system comprising a pattern generator arranged to generate a data encoding pattern for application to a document, and a receiving system arranged to receive data over a communication link wherein the pattern generator is arranged to generate the pattern so as to encode data defining a communication parameter suitable for the transmission of payload data to the receiving system over the link. Such a document processing system is suitable for use with a pen according to the invention, and the present invention further provides a document processing system comprising a pen according to the first aspect of the invention and a document processing system according to the second aspect.

According to a third aspect of the invention there is provided a document producing system comprising a pattern generating system arranged to generate a data encoding pattern and associate it with a document such that the document can be produced having the pattern thereon, and a receiving system arranged to receive over a communication link pen stroke data derived from pen strokes made on the document, wherein the pattern generating system is arranged to generate the pattern so as to encode communication data defining a communication parameter arranged to control communication of the pen stroke data so as to restrict its reception other than by the receiving system.

The communication parameter may identify the receiving system as a system to which the pen stroke data should be transmitted.

Such a system can be used to form a closed system in which the generation of the pattern and the processing of the pen stroke data are carried out by the same system. This system may comprise a single computing device, such as a PC, a PDA or a printer, or a group of devices connected together, for example in a wired or wireless network.

The communication data may be arranged to encode a unique address of the device, or one of the group of devices. Alternatively or in addition it may be arranged to encode an encryption parameter arranged to ensure that the pen stroke data is transmitted in a format that can be deciphered by the document producing system.

Corresponding methods of processing a document and producing a document are also provided.

Data carriers for carrying data arranged to control a product marking system, or a reading system to carry out the methods of the invention, and to operate as systems of the invention are also provided. The data carrier can comprise, for example, a floppy disk, a CDROM, a DVD ROM/RAM (including +RW, -RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the accompanying drawings.

DESCRIPTION OF THE PREFERRED EMBODIMENTS

Figure 1:
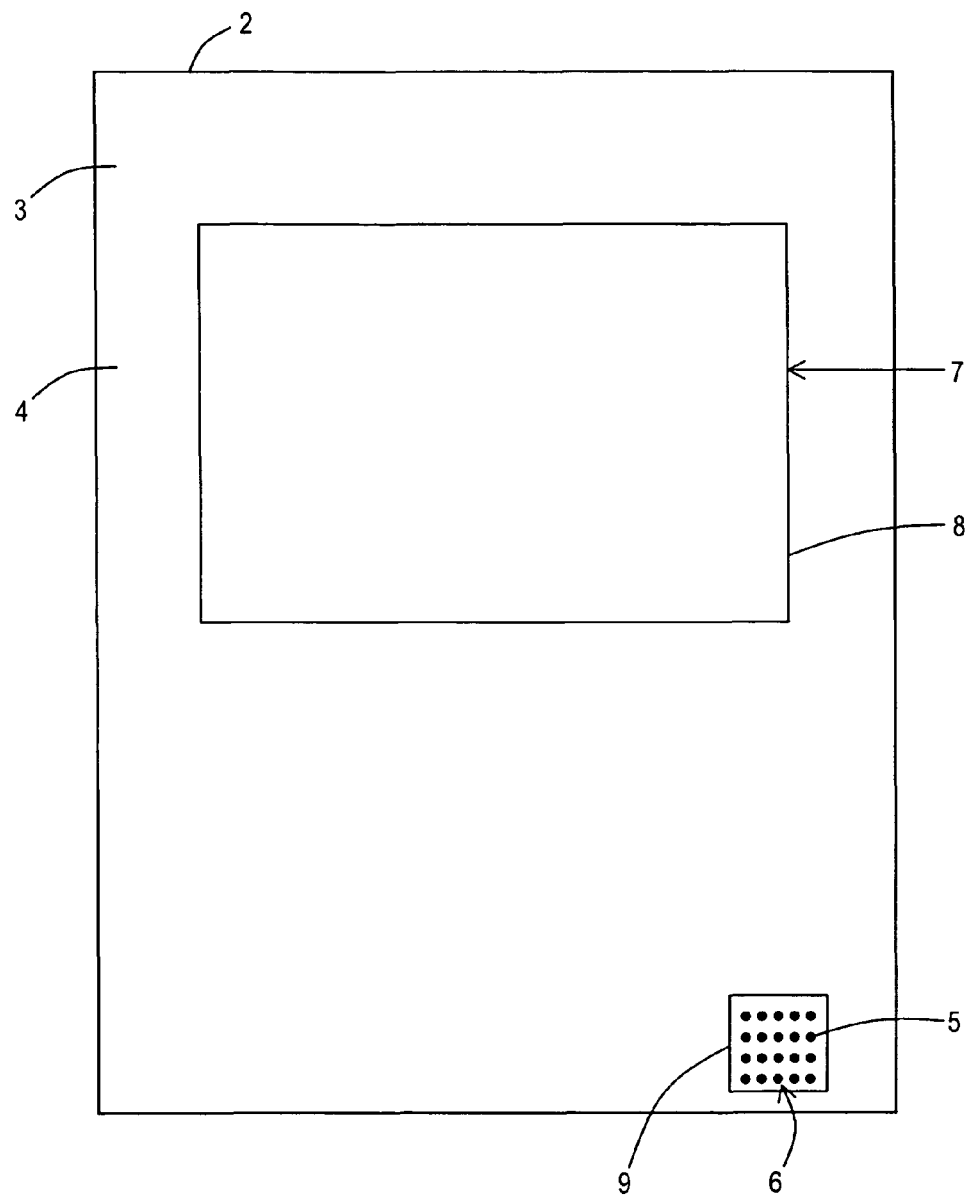
FIG. 1 shows a document having data encoding pattern on it according to an embodiment of the invention.

Referring to FIG. 1, a document 2 for use in a digital pen and paper system comprises a carrier 3 in the form of a single sheet of paper 4 with data encoding markings 5 printed on some parts of it. The markings 5, which are not shown to scale in FIG. 1, form a pattern 6 on the document 2, that includes a position coding component and a communication parameter encoding component. Also printed on the paper 4 are further markings 7 which are clearly visible to a human user of the form, and which make up the content of the document 2. The content includes a box 8 defining a writing area in which a user is to write, and a send box 9 which can be marked to trigger processing of pen strokes made on the document 2 as will be described below.

Figure 2:
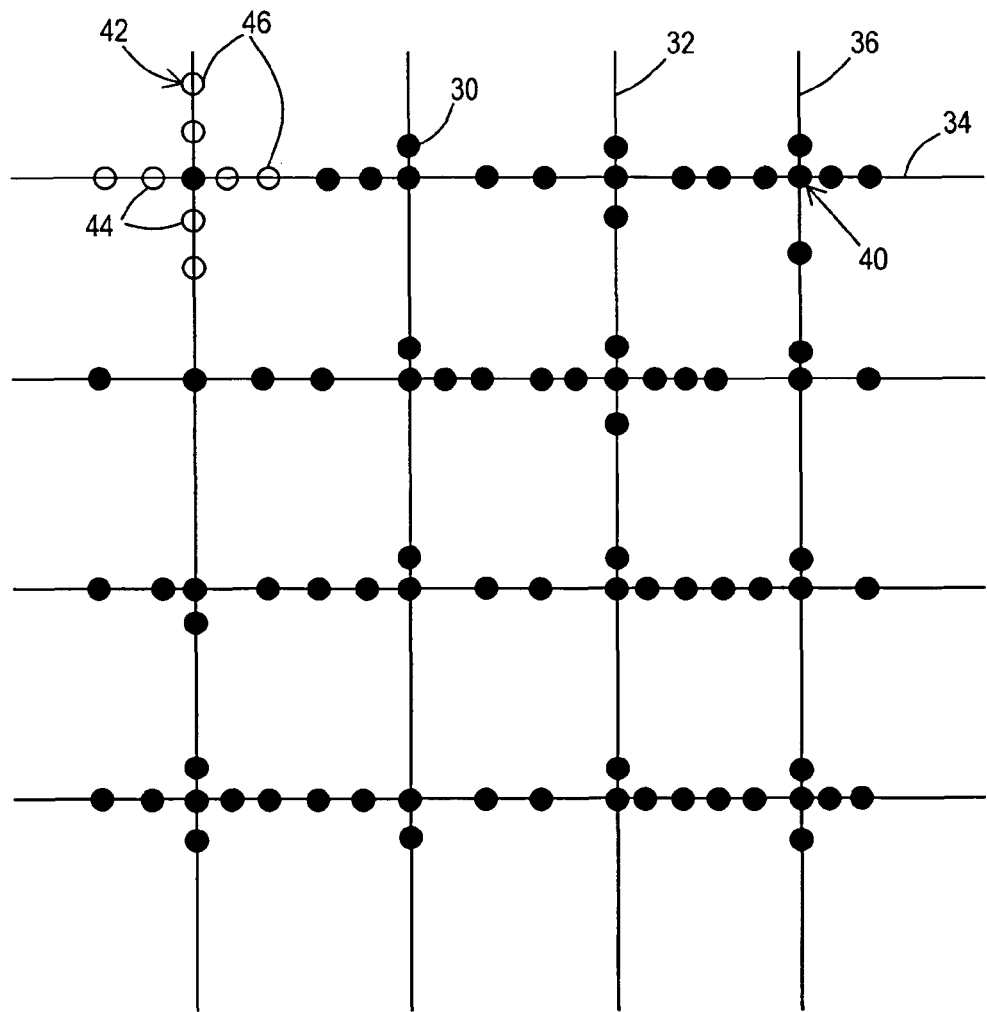
FIG. 2 shows schematically details of the pattern of the document of FIG. 1.

Referring to FIG. 2, the position identifying pattern 6 is made up of a number of black ink dots 30 arranged on an imaginary grid 32. The grid 32, which is shown in FIG. 2 for clarity but is not actually marked on the document 2, can be considered as being made up of horizontal and vertical lines 34, 36 defining a number of intersections 40 where they cross. The intersections 40 are of the order of 1.3 mm apart, and the dots 30 are of the order of 100 μm across. A group of dot positions 42 is associated with each intersection 40. Each group comprises one dot position at which there is a central dot 41 at the intersection 40. This identifies the grid. Four position identification dot positions 44 are arranged around the central dot 41. The presence or absence of dots in each of these positions is used to code positional data identifying the position on the document. For example any group of nine intersections 40 will encode sufficient positional data to identify it uniquely within a very large defined area of the pattern. Therefore if a reading device is arranged to image an area of nine intersections, it can determine the position of the imaged pattern in the pattern space. Four further dot positions 46 are arranged on the grid lines 34, 36 outside the position identification dot positions 44, and the presence or absence of dots in these positions is used to encode further data, in this case communication data. The communication data will generally be constant over any particular region or area of the document, for example within the send box 9. In the example shown in FIG. 2, the communication data component of the pattern 6 includes two dots in the positions 46 on the horizontal grid lines 34, but no dots on the corresponding positions on the vertical grid lines. This can be detected provided the orientation of the pattern can be determined from the position identification component. If this is not possible, then simply the number of dots at each intersection 40 in the communication component of the pattern can be used to encode the communication data.

Figure 3:
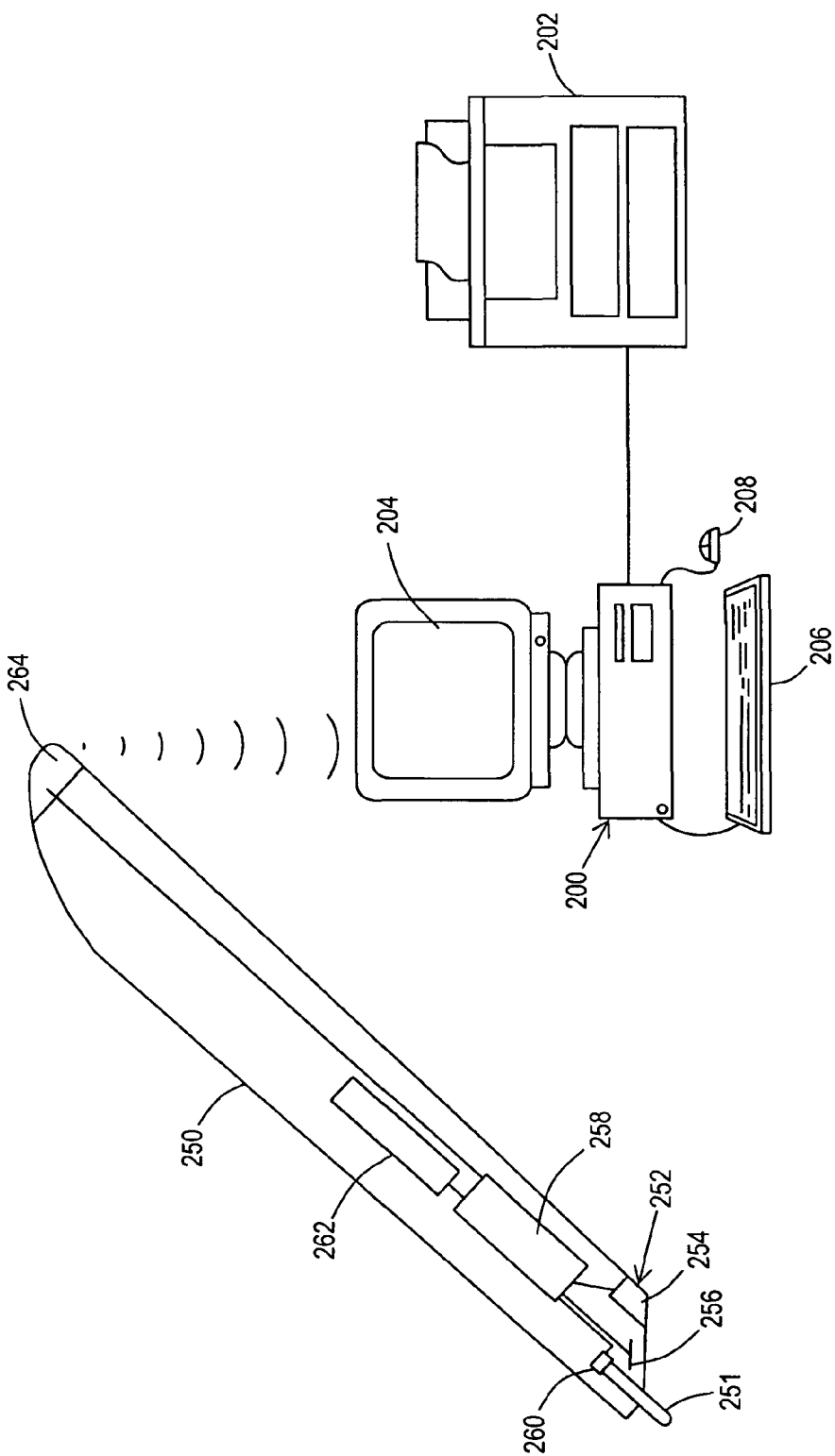
FIG. 3 shows a system according to an embodiment of the invention arranged for producing and processing the document of FIG. 1.
Figure 4:
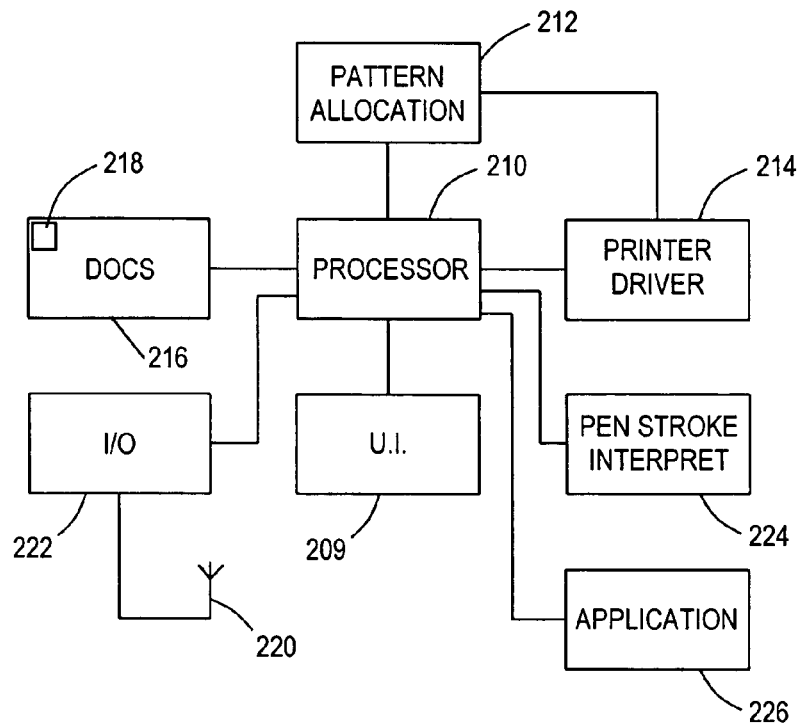
FIG. 4 is a block diagram showing functional units within a computer of the system of FIG. 3.

Referring to FIG. 3 a document processing system according to an embodiment of the invention comprises a personal computer (PC) 200 and a printer 202. The PC 200 has a screen 204, a keyboard 206 and a mouse 208 connected to it to provide a user interface 209 as shown generally in FIG. 4. As also shown in FIG. 4, the PC 200 comprises a processor 210 and a pattern allocation module 212 which is a software module stored in memory. The pattern allocation module 212 includes the definition of the total area of pattern space and a record of which parts of that total area have been allocated to specific documents, for example by means of coordinate references. The PC 200 further comprises a printer driver 214, which is a further software module, and a memory 216 having electronic documents 218 stored in it. The user interface 209 allows a user to interact with the PC 200.

Referring back to FIG. 3, a pen 250 for reading the pattern 6 comprises a writing nib 251, and a camera 252 made up of an infra red (IR) LED 254 and an IR sensor 256. The camera 252 is arranged to image a circular area adjacent to the tip of the pen nib 251. A processor 258 processes images from the camera 252 taken at a predetermined rapid sample rate. A pressure sensor 260 detects when the nib 251 is in contact with the document 2 and triggers operation of the camera 252. Whenever the pen 250 is being used on a patterned area of the document 2 the camera 252 captures a sequence of frames and, for each frame, the processor 258 can extract from the pattern 6 positional data and other data that have been encoded in the pattern. The positional data will define a sequence of positions, one for each image sample, which is saved in the pen's memory 262 as pen stroke data, and can be transmitted to the PC 200 via a Bluetooth radio frequency transmitter 324 in the pen 300. The other data can also be stored in the pen's memory 262 and used for whatever purpose it is intended for. In this case it is used to control the communication between the pen 250 and the PC 200 as will be described in more detail below.

Referring back to FIG. 4, the PC 200 further comprises a Bluetooth radio frequency receiver 220 and an input/output module 222 which processes the signals received by the receiver 220 and inputs them to the processor 210. It also includes a pen stroke interpretation module 224 which is arranged to interpret the pen stroke data from the pen 300 and an application 226 which uses the pen stroke data to perform a function related to the documents 116. When the pen stroke data is received, it is forwarded to the pen stroke interpretation module 224 which interprets the pen strokes and processes them as required.

Figure 5:
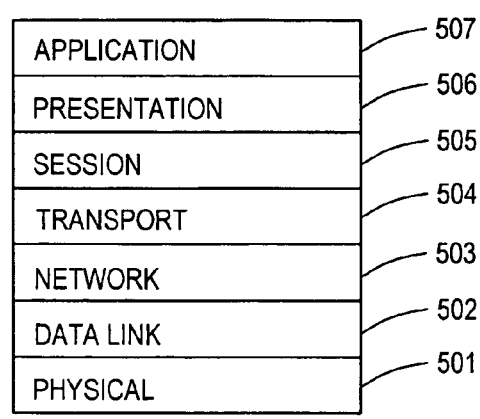
FIG. 5 is a diagram showing a model of layers of the communication between a pen and a computer of the system of FIG. 3.

Referring to FIG. 5, the signals transmitted from the pen are built up according to the standard OSI seven layer model. The pen stroke data, which will form the payload of the signals, can be considered to start at the highest level, and then as the pen processes that data in various ways to convert the data to a format ready for transmission, it works down through the layers modifying and adding to the data until, at the bottom layer the data is ready to be transmitted. On receipt the PC takes the data back up through the various layers of processing until, at the highest level, the pen stroke data is ready to be processed by the application that processes the pen strokes. The various levels will be described as applicable to the Bluetooth wireless link of this embodiment and also as applicable to other wireless links and to various wired links.

The lowest layer in this model is the physical layer 501. This describes parameters defining the physical properties of the communication between the pen 250 and the PC 200, such as whether it is a wireless link, for example using Bluetooth, Infrared Data Association (IrDA), or Wireless Fidelity (WiFi), or whether it is a wired link such as a universal serial bus (USB) link or Ethernet link. This layer also defines, for wired links, the electrical properties of the link such as the size of the Ethernet coaxial cable, the type of BNC connector and the termination method. It also defines, where appropriate, the media access control (MAC) address, data rates, modem settings, flow control, parity and other settings.

The second layer is the Data Link Layer. Generally this describes parameters defining the logical organisation of the data bits transmitted over a particular medium, such as the framing, addressing and checksumming of Ethernet packets, and packet sizes. In this case it will define, for example, the packet size of the communication between the pen 250 and the PC 200.

The third layer is the networking layer. Generally this describes parameters defining how a series of exchanges over various data links can deliver data between any two nodes in a network. In this case this layer describes the IP address of the PC to which the communication from the pen 250 is directed. It can also define how the PC 200 is to communicate over a network to which it is connected once it has received data from the pen, for example an IP address to communicate with, a hostname to look up and talk to, a protocol to use, such as TCP/IP or UDP, or a telephone number to dial.

The fourth layer is the transport layer. This generally describes parameters defining the quality and nature of data delivery, such as if and how retransmissions will be used to ensure data delivery. In this case it will define window sizes for protocols, i.e. the number of packets that can be sent without acknowledgement, transport protocol packet sizes and the number of retries that will be performed in the event of an initially unsuccessful transmission.

The fifth layer is the session layer which can describe parameters relating to the destination of the communication and user logon. And the last two layers are the session layer, the presentation layer and the application layer, which are not relevant to this invention.

In order for the PC 200 to produce the printed document 2 the processor 210 retrieves an electronic document 218 from the memory 216 and sends it to the printer driver 214. The electronic document 218 contains, in this case, a definition of the positions in which the pattern 6 is to be applied. This could instead be determined by the printer driver 214. The processor 210 also determines, for example from data stored in memory, certain parameters that will be required for the pen 250 to communicate with the PC, and communicates these parameters to the pattern allocation module 212. The printer driver 214 allocates a unique document identification code to the document to be printed and requests the required pattern 6 from the pattern allocation module 212. The pattern allocation module 212 generates the required pattern 6 to be applied to the document 2 such that each part of the pattern encodes the required data. In this case the pattern 6 to be applied to the writing area box 8 includes only positional data, and the pattern area to be applied to the send box 9 encodes positional data and also data defining the communication parameters. The pattern allocation module then communicates the details of the pattern including the positions of all the required dots, back to the printer driver 214. The printer driver 214 then adds the pattern areas 112 to the electronic document to form an image which includes the pattern and the content, converts the document including the pattern areas 112 to a format suitable for the printer 202, and sends it to the printer which prints the document 116 including the pattern areas 112.

In operation, the PC is used to produce a document 2 that the PC 200 is itself arranged to process. Also the PC is arranged to embed in the pattern 6 on the document 2, data that will define parameters of the communication between the pen 250 and the PC 200, so as to optimise that communication in terms of speed, reliability and security. These parameters can include any of those described above. In this case the address of the PC in the form of a Bluetooth MAC address is included so that the pen can transmit the data directly to the PC. Clearly different documents, or pages within the same document, can be printed with different communication parameters in each, so that pen stroke data from each page can be sent to a different respective receiving device, without any re-programming by the user.

Figure 6:
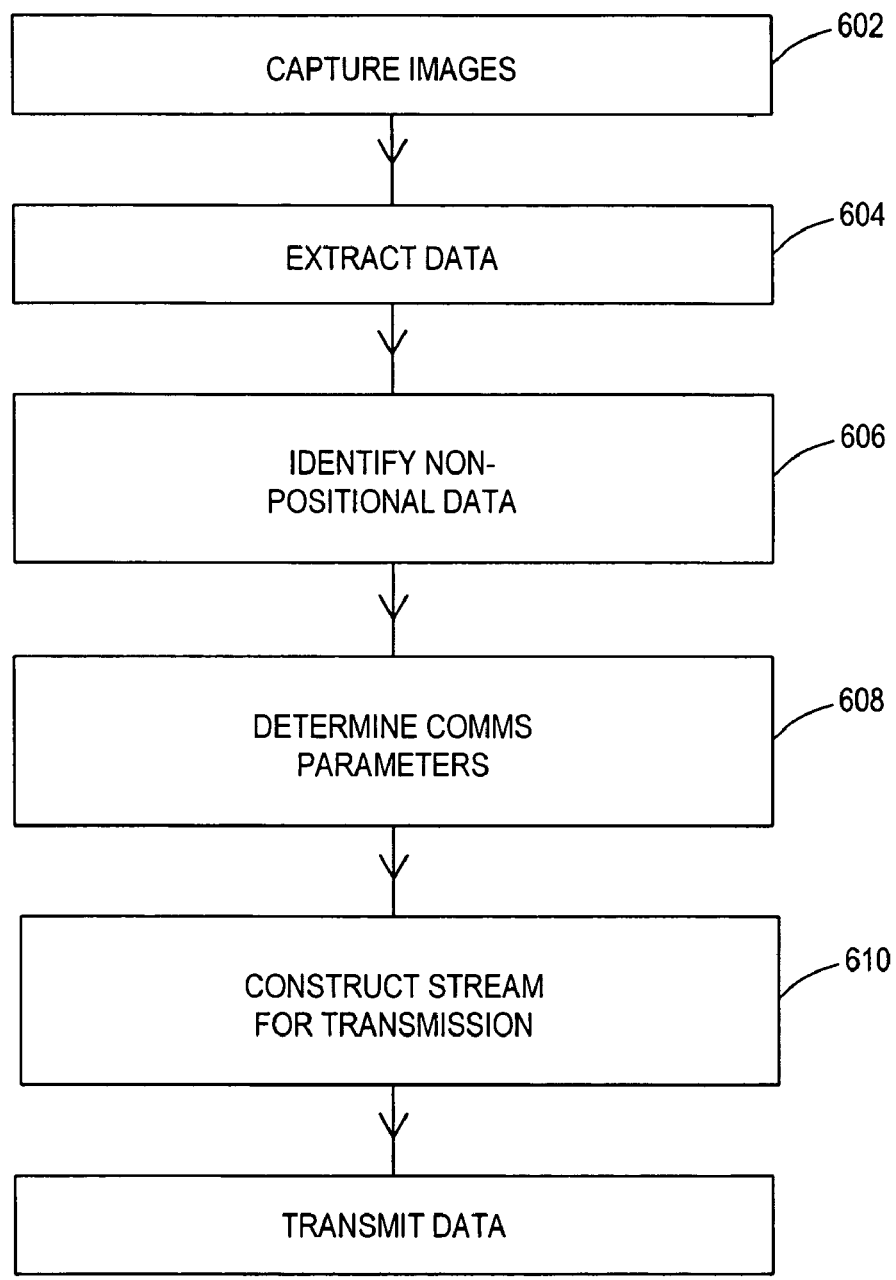
FIG. 6 is a flow chart showing a method of transmitting data using the system of FIG. 3.

Referring to FIG. 6, when the pen 250 is used to write on the document 2, it is first used to write in the box 8. As this is done, the camera captures images at step 602 and, for each one extracts data at step 604 from an area of the pattern, in this case an area covering nine of the intersections 40. For each frame the processor 258 analyses the data and identifies a part of it that identifies the position in pattern space of the pattern. While that position corresponds to a position that has been allocated to the box 8, the pen stores the position of each frame in its memory as pen stroke data. If the positional data indicates that the pen is in a position within the send box 9, then the processor identifies and analyses the non-positional data at step 606, and determines from it the relevant communication parameters at step 608. When these parameters have been determined the processor 258 constructs, at step 610 a data stream ready for transmission. This step corresponds to moving the pen stroke data down through the layers of the OSI model, modifying it and adding headers and other data, until the data is in a form suitable for transmission direct to the PC 200. This includes adding the MAC address of the PC to the data so that the data can be sent direct to the PC 200.

It will be appreciated that the system described above can operate as a closed system, in that the PC 200, when printing the document 2, can control the wireless transmission from the pen 250 so that the pen stroke data produced by the pen 250 writing on the document 2 will be transmitted directly back to the PC 200. Depending on the type of wireless transmission, the PC 200 can also embed data relating to encryption into the document 2. The pen 250 is then arranged to extract the encryption data, for example in the form of a public encryption key, from the pattern 6 on the document 2, corresponding to the processing system's private encryption key. This enables the pen 250 to transmit the pen stroke data in an encrypted format over the wireless communication link to the PC 200, the encryption being determined by the PC 200 so that it can decipher the data when it receives it. Other parameters of the wireless communication from the pen 250 to the PC 200 can also be controlled in the same way. Similarly if the pen 250 is connected to the PC 200 by means of a wired connection or a docking station, communication parameters appropriate to that arrangement can also be controlled in the same way.

It will also be appreciated that, because the address of the receiving system, in this case the MAC address of the PC 200 can be determined by the pen 250 from the pattern 6 on the document 2, the pen stroke data can be sent directly to the PC 200 without the need for an initial pairing process. Such a process is necessary for example in Bluetooth systems where the transmitting device needs to establish the presence of a suitable receiving device and identify it before the transmission can occur. The avoidance of this process can speed up the transmission of data from the pen 250 to the PC 200.

In the embodiment described above the user does not need to consciously select any of the communication parameters defining the communication between the pen 250 and the PC 200. This makes the system simple to use. However, in a modification to the embodiment described above, the document 2 can include a number of different send boxes 9, each one embedding different communication data. For example the different send boxes could be associated with a different document processing device, each one containing pattern embedding the address of a different device to which the data will be sent by the pen 250 if that box is marked with the pen 250. Alternatively the different boxes can embed data identifying different levels of encryption or different encryption keys, such that the encryption that the pen 250 will apply to the transmitted payload data will depend on which of the boxes is marked with the pen 250. This type of arrangement provides a user with a degree of choice, whereby the user can select one or more of the communication parameters by selecting an area of the document and marking it with the pen 250. Alternatively the different send boxes can be associated with different parts of the document 2, for example different pages or different sections. The different send boxes can encode different communication parameters, such that data from the different parts of the document will be sent to different receiving devices, without the need for user intervention to select the receiving device.

Further modifications to the embodiment described above can also be provided. For example the device to which the pen transmits the data over the communication link could be any of a number of devices, such as a personal digital assistant (PDA), a mobile telecommunications device such as a mobile phone, or a printer. If the receiving device is a printer, it can be arranged to contact a server to obtain an electronic copy of the document 2, and then print the document with the pen strokes made on it by the pen. Alternatively the document 2 can be a form arranged to allow a user to control the printer itself. In this case the printer would be arranged to interpret the pen stroke data as instructions to control its operation.

Figure 7:
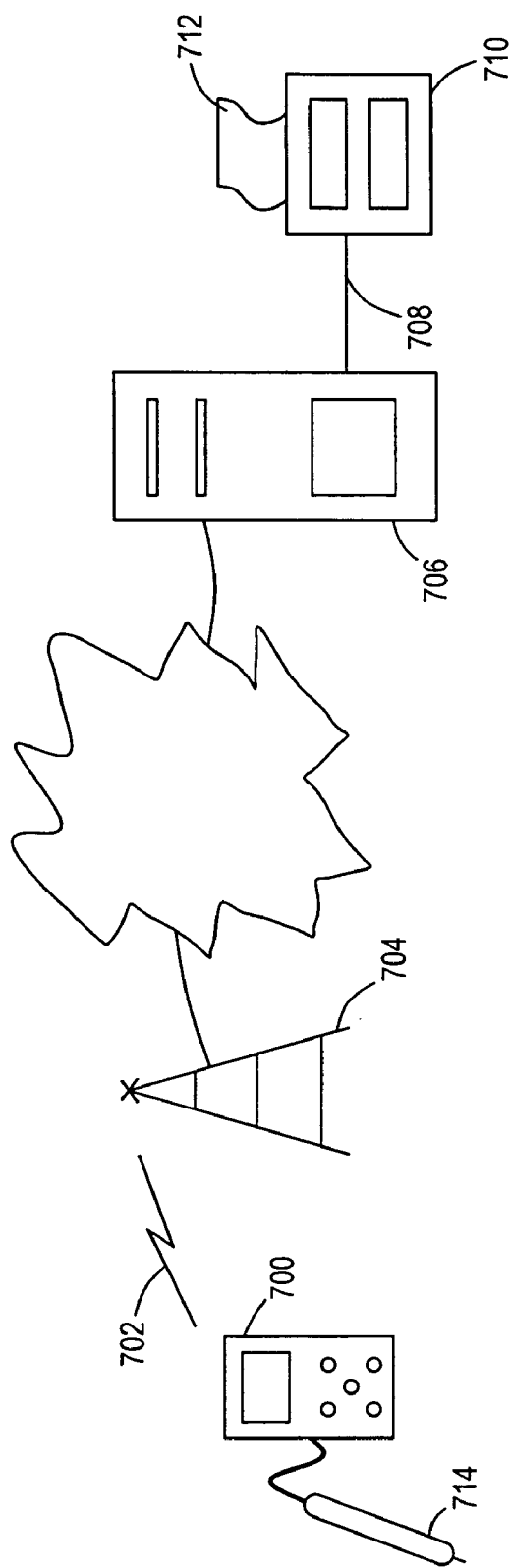
FIG. 7 is a diagram showing a document processing system according to a second embodiment of the invention.

Referring to FIG. 7, in a second embodiment of the invention a personal digital assistant (PDA) 700 is provided with a WiFi connection 702 to an internet access node 704. An internet connected server 706 is connected via a local network 708 to a printer 710. The server 706 runs an application for producing and processing documents 712 that have data encoding pattern on them similar to the document 2 described above. This system is suitable, for example, where an organisation such as a bank, issues a large number of documents 712 for distribution among branches or customers, each of which has their own PDA 700 for use with the system, and requires the pen stroke data from all of the documents 712 to be transmitted back to the bank's server 706 for processing. In this case a reading device in the form of a pen 714 is provided with a USB connection that enables it to be connected to the PDA 700 of a particular user.

The server 706 prints a number of the documents 712 and embeds in each one data defining the unique address, in this case the IP address, of the server 706. The IP address is in a 32 bit format, made up of four sections of eight bits each (8.8.8.8). As an alternative a host name could be embedded identifying the host that processes the documents. Such a host name might be in the format "formapplication.hp.com" for example. It also embeds data defining the unique address of the PDA 700, for example where the document 712 is designed for use by a single customer who owns the PDA 700. Other parameters of the required communication between the pen 714 and the server 706 can also be embedded. These parameters can relate to the communication from the pen 714 to the PDA, or to any of the other steps in the communication to the server 706. As mentioned above in relation to the first embodiment, these can include parameters in a number of different layers of the OSI seven layer model.

This second embodiment also operates as a closed system in that the documents produced by the server 706 are also arranged to be processed by the server 706, and pen stroke data from those documents is arranged to be transmitted back to the server 706.

The invention claimed is:

1. A pen for extracting data from a data encoding pattern on a product, the pen comprising:
   a sensing system to sense the pattern as the pen is passed over the product,
   a processor to extract communication data and payload data from the pattern and determine from the communication data a communication parameter, and
   a transmitter to transmit the payload data, using the determined communication parameter, from the pen to a receiving system,
   wherein the processor is to extract positional data from an area of the pattern, use the positional data to determine whether the area of the pattern encodes the communication data, and, if the processor determines that the area of the pattern encodes the communication data, extract the communication data from the pattern, and
   wherein the processor is to use the positional data to form the payload data.

2. The pen according to claim 1, wherein the transmitter is to transmit the payload data over a wireless communication link to the receiving system.

3. The pen according to claim 1, wherein the payload data is pen stroke data recording movements of the pen over the product.

4. The pen according to claim 1, wherein the parameter is to identify the receiving system to which the communication is to be made.

5. The pen according to claim 1, wherein the communication parameter is an encryption key to enable the pen to transmit the payload data to the receiving system in an encrypted format.

6. The pen according to claim 1, wherein the processor is to identify a first component of the pattern from which it extracts the positional data, and a second component of the pattern from which it extracts the communication data.

7. A document processing system comprising:
   a pattern generating system to generate a data encoding pattern for application to a document;
   a memory to store the document;
   a receiving system to receive, over a communication link, payload data from a reader, wherein the reader is operable to extract from a data encoding pattern on a product similar to the document stored in the memory, and wherein the payload data from the reader includes positional data identifying positions of the reader on the product;
   a document generating system to receive the document from the memory and the pattern from the pattern generating system to produce the document having the pattern thereon in accordance with the payload data received from the reader; and
   a processor to implement the document generating system;

wherein the pattern generating system is to encode the positional data and communication data to generate the data encoding pattern, the communication data defining a communication parameter suitable for transmission of the payload data to the receiving system over the communication link, and wherein the data encoding pattern includes at least one group of dots including a center dot, position-identification dots surrounding the center dot to encode the positional data, and communication-data dots located outside of the position-identification dots to encode the communication data.

8. The document processing system according to claim 7, wherein the communication parameter is an encryption key arranged to enable encryption of the payload data in a manner that can be deciphered by the document processing system.

9. The document processing system according to claim 7, wherein the communication parameter is arranged to identify the receiving system to which the communication is to be made.

10. A document producing system comprising:

a pattern generating system to generate a data encoding pattern and associate the data encoding pattern with a document such that the document can be produced having the pattern thereon;

a memory to store the document;

a receiving system arranged to receive over a communication link pen stroke data from a pen, wherein the pen stroke data is derived from pen strokes made by the pen on a product similar to the document stored in the memory, and wherein the pen stroke data includes positional data identifying positions of the pen on the product; and a document generating system to receive the document from the memory and the pattern from the pattern generating system to produce the document having the pattern thereon in accordance with the pen stroke data received from the pen, wherein the pattern generating system is to encode the positional data and communication data to generate the data encoding pattern, the communication data defining a communication parameter arranged to control communication of the pen stroke data so as to restrict its reception other than by the receiving system, and wherein the data encoding pattern includes at least one group of dots including a center dot, position-identification dots surrounding the center dot to encode the positional data, and communication-data dots located outside of the position-identification dots to encode the communication data.

11. The document producing system according to claim 10, wherein the communication data is arranged to identify the receiving system as a system to which the pen stroke data should be transmitted.

12. The document producing system according to claim 10, wherein the pattern generating system and the receiving system are both part of a single computing device.

13. The document producing system according to claim 12, wherein the communication data is arranged to encode a unique address of the computing device.

14. The document producing system according to claim 10, wherein the communication data is arranged to encode an encryption parameter arranged to ensure that the pen stroke data is transmitted in a format that can be deciphered by the receiving system.

15. A method of processing a document comprising:

sensing a pattern on a product using a reader;

extracting positional data from an area of the pattern;

determining whether the area of the pattern encodes communication data using the positional data;

if the area of the pattern is determined to encode the communication data, extracting the communication data from the pattern;

generating payload data from the positional data;

determining a communication parameter from the communication data; and transmitting the payload data from the reader to a receiving system using communication having said communication parameter.

16. The method according to claim 15, wherein the communication is wireless.

17. A method of producing a document comprising:

generating a data encoding pattern and associating it with a document stored in a memory;

receiving pen stroke data from a pen, wherein the pen stroke data includes positional data identifying positions of the pen on a product similar to the document stored in the memory;

using a document generating system to receive the document and the generated data encoding pattern to produce the document having the data encoding pattern thereon such that the pen stroke data from the pen is produced on the document using the data encoding pattern; and using a processor to send the document and the generated data encoding pattern to the document generating system, wherein the pattern is generated by encoding the positional data and communication data, the communication data defining a communication parameter to restrict communication of the pen stroke data other than to the document generating system, and wherein the data encoding pattern includes at least one group of dots including a center dot, position-identification dots surrounding the center dot to encode the positional data, and communication-data dots located outside of the position-identification dots to encode the communication data.

18. A pen arranged to read a pattern on a product as the pen is passed over the product, wherein the pen is to identify its position on the product using positional data extracted from a first area of the pattern, to use the positional data to determine whether the pattern encodes communication data, and, if the pen determines that the pattern encodes the communication data, to extract the communication data from a second area of the pattern, and wherein the pen is further to determine a communication protocol from the extracted communication data, and to communicate with a receiving device using the communication protocol.

* * * * *